United States Patent
Li et al.

(10) Patent No.: US 9,098,301 B2
(45) Date of Patent: Aug. 4, 2015

(54) ELECTRONIC DEVICE AND BOOTING METHOD

(71) Applicant: VIA TECHNOLOGIES, INC., New Taipei (TW)

(72) Inventors: Kai Li, Beijing (CN); Jiangbo Wang, Beijing (CN); Wei Yin, Beijing (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 128 days.

(21) Appl. No.: 14/017,378

(22) Filed: Sep. 4, 2013

(65) Prior Publication Data

US 2014/0129818 A1     May 8, 2014

(30) Foreign Application Priority Data

Nov. 2, 2012    (CN) .......................... 2012 1 0433420

(51) Int. Cl.
| | |
|---|---|
| *H04L 9/32* | (2006.01) |
| *G06F 9/44* | (2006.01) |
| *G06F 1/24* | (2006.01) |

(Continued)

(52) U.S. Cl.
CPC ............... *G06F 9/4403* (2013.01); *G06F 1/24* (2013.01); *G06F 21/572* (2013.01); *G06F 21/575* (2013.01); *G06F 21/79* (2013.01)

(58) Field of Classification Search
CPC . G06F 12/0802; G06F 12/14; G06F 12/1408; G06F 12/1416; G06F 21/70; G06F 21/72; G06F 21/76; G06F 13/16; G06F 3/062; G06F 3/0622; G06F 21/572; G06F 21/575; G06F 21/79

USPC .............. 713/2, 187, 190, 193; 726/26, 27; 711/100, 102

See application file for complete search history.

(56) References Cited

U.S. PATENT DOCUMENTS 5,802,376 A * 9/1998 DeRoo et al. ................. 710/200
7,152,193 B2 * 12/2006 Watkins et al. ............... 714/724

(Continued)

FOREIGN PATENT DOCUMENTS

| | | |
|---|---|---|
| CN | 1627260 | 6/2005 |
| TW | 200943123 | 10/2009 |
| TW | 201137656 | 11/2011 |

OTHER PUBLICATIONS

English language machine translation of TW 200943123 (published Oct. 16, 2009).

(Continued)

*Primary Examiner* — Hosuk Song
(74) *Attorney, Agent, or Firm* — McClure, Qualey & Rodack, LLP

(57) ABSTRACT

The present invention provides an electronic device including a write-once-then-read-only register, a chipset, a read-only memory, a flash memory and a central processor. The write-once-then-read-only register is arranged to store a determination value. The chipset is arranged to produce a CPU reset signal. The read-only memory is implemented in the chipset, and has a first memory block which corresponds to a predetermined address and is used to store a first instruction. The flash memory is coupled to the chipset, and has a second memory block which corresponds to the predetermined address and is used to store a second instruction. The central processor is arranged to determine the location of the predetermined address according to the CPU reset signal and the determination value.

20 Claims, 7 Drawing Sheets

(51) Int. Cl.
*G06F 21/57* (2013.01)
*G06F 21/79* (2013.01)

(56) References Cited

U.S. PATENT DOCUMENTS

| | | | |
|---|---|---|---|
| 7,188,282 B2 * | 3/2007 | Walmsley | 714/718 |
| 8,656,146 B2 | 2/2014 | Findeisen et al. | |
| 8,738,932 B2 * | 5/2014 | Lee et al. | 713/190 |
| 2004/0158742 A1 * | 8/2004 | Srinivasan et al. | 713/201 |
| 2005/0132177 A1 | 6/2005 | Challenger et al. | |

OTHER PUBLICATIONS

English language machine translation of TW 201137656 (published Nov. 1, 2011).

English language translation of abstract of CN 1627260 (published Jun. 15, 2005).

* cited by examiner

ELECTRONIC DEVICE AND BOOTING METHOD

CROSS REFERENCE TO RELATED APPLICATIONS

This Application claims priority of The China Patent Application No. 201210433420.X, filed on Nov. 2, 2012, the entirety of which is incorporated by reference herein.

BACKGROUND OF THE INVENTION

1. Field of the Invention

The present invention relates to a chipset, and in particular relates to a chipset with a security verification code.

2. Description of the Related Art

Generally, electronic systems such as personal computers include a Basic Input Output System (BIOS), wherein the BIOS code is stored in flash memory of the electronic system. Two of the most important programs of BIOS code are the Power On Self Test (POST) and the booting process. When the electronic system is powered-on or reset, the first instruction issued by the processor of the electronic system will access an address to execute the BIOS code, and execute the Power On Self Test (POST) and booting process by the BIOS code. Therefore, third parties without authorization might attack the electronic system by tampering with the BIOS code or replacing the flash memory containing the BIOS code.

In sum, at the beginning of the start-up process, there are no processes to provide secure authentication, such that the user cannot avoid the risk of his electronic system's BIOS code being tampered with or otherwise losing integrity.

BRIEF SUMMARY OF THE INVENTION

A detailed description is given in the following embodiments with reference to the accompanying drawings.

The present invention provides an electronic device. The electronic device includes a write-once-then-read-only register, a chipset, a flash memory, and a central processor. The write-once-then-read-only register is arranged to store a determination value. The chipset is arranged to produce a CPU reset signal. The read-only memory is implemented in the chipset, wherein the read-only memory has a first memory block corresponding to a predetermined address, and the first memory block is arranged to store a first instruction. The flash memory is coupled to the chipset, wherein the flash memory has a second memory block corresponding to the predetermined address, and the second memory block is arranged to store a second instruction. The central processor is arranged to determine the location of the predetermined address according to the CPU reset signal and the determination value, wherein the central processor retrieves the first instruction when the determination value is a first predetermined determination value, and the central processor retrieves the second instruction when the determination value is a second predetermined determination value.

The present invention further provides a booting method applied to an electronic device, wherein the booting method comprises: producing a CPU reset signal by a chipset, and transmitting the CPU reset signal to a central processor; determining the location of a predetermined address by the central processor according to the CPU reset signal and a determination value of a write-once-then-read-only register; retrieving a first instruction from a first memory block of a read-only memory when the determination value is a first predetermined determination value, wherein the first memory block corresponds to the predetermined address; and retrieving a second instruction from a second memory block of a flash memory when the determination value is a second predetermined determination value, wherein the second memory block corresponds to the predetermined address, wherein the read-only memory is implemented in the chipset.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

For computer systems (e.g. computer systems using the Microsoft Windows operating system), power management for reducing power consumption can be achieved by using the standby states defined by the "Advanced Configuration and Power Interface (ACPI)". There are six states S0 to S5 defined by the ACPI. State S0 indicates that the computer system is at working state. In the standby state S1, the CPU in the computer system is not working, and in the standby state S2, the CPU in the computer system shuts down. State S3 is a standby state with a short resumption time (e.g. 5 seconds or shorter) and is also regarded as a "suspend to RAM" state, wherein a computer system can be recovered to the working state (e.g. state S0) quickly and only RAM is powered. The hibernate state S4 is also regarded as a "suspend to disk" state, and the computer system has low power consumption and long resumption time (e.g. 20 seconds or longer) in the standby state S4. The aforementioned standby states S1 to S4 save power at different levels, and state S5 is a shutdown state. In state S5, The software and elements of the computer is turned off, but some components of the computer are still powered, so that the computer can still be woken up by the keyboard, clock, modem (telephone wake-up), WoL (Wake-on-LAN) or USB device, etc.

Figure 1A:
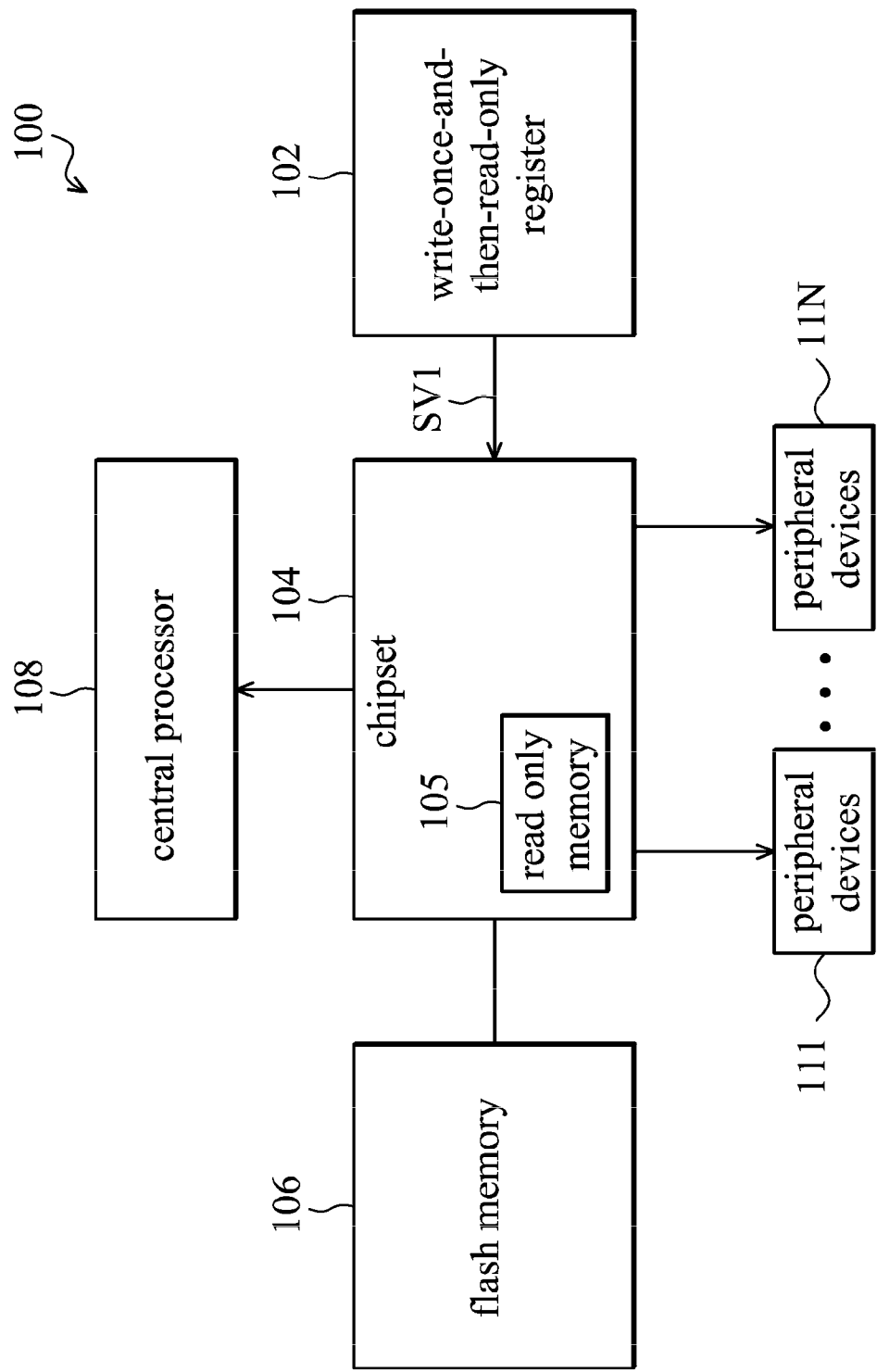
FIG. 1A is a schematic diagram illustrating an embodiment of an electronic device of the present invention.

FIG. 1A is a schematic diagram illustrating an embodiment of an electronic device of the present invention. The electronic device 100 can be woken-up from a sleep state and resume back to a normal working state via a wake-up process. Moreover, the electronic device 100 can enter the normal working state by a warm boot or a cold boot. It should be noted that, in one embodiment, the normal working state is State S0 as defined by the ACPI, and the sleep state includes States S3-S5 as defined by the ACPI. Moreover, the process that powers on the electronic device 100 from the shut-down state is called a cold boot process (such as via pressing the power button). The process of restarting the electronic device 100 in the normal working state by software (such as the operation system or BIOS) is called a warm boot process. In some embodiments, the sleep state and the normal working state is not limited to the ACPI definition. The electronic device 100 can be can be any computer device capable of calculating data, such as a desktop computer, a mobile phone, a notebook computer, a PDA, etc., but it is not limited thereto. In some embodiments, the electronic device 100 is x86 system-capable, but it is not limited thereto. The electronic device 100 includes a write-once-and-then-read-only register 102, a chipset 104, a flash memory 106, a central processor 108, and at least one peripheral device 111-11N.

The write-once-and-then-read-only register 102 is arranged to store a determination value SV1. In one embodiment, a first predetermined determination value is set as a default value of the determination value SV1. Furthermore, the write-once-and-then-read-only register 102 preserves the determination value SV1 when powered, and the write-once-and-then-read-only register 102 allows the determination value SV1 to be rewritten only one time until power is lost. When the write-once-and-then-read-only register 102 is rewritten, the default value (the first predetermined determination value) of the determination value SV1 is replaced by a second predetermined determination value. Namely, the write-once-and-then-read-only register 102 is rewritten to hold the second predetermined determination value as the determination value SV1, and the write-once-and-then-read-only register 102 preserves the second predetermined determination value until power is lost. Namely, the determination value SV1 stored in the write-once-and-then-read-only register 102 is the first predetermined determination value (default value) after the electronic device 100 starts to execute the cold boot process, or the wake-up process woken up from sleep state. In another embodiment, when the electronic device 100 is executing the warm boot process, the chipset 104 is arranged to produce a PCI reset signal PCIRST# for resetting the rewritten determination value SV1 to be the first predetermined determination value (default value). Next, if the determination value SV1 of the write-once-and-then-read-only register 102 is rewritten, the second predetermined determination value serves as the determination value SV1 until the electronic device 100 enters sleep state (such as States S3, S4 or S5 as defined by ACPI) or is shut down. Namely, when the electronic device 100 enters sleep state or is shut down, power is no longer provided to the write-once-and-then-read-only register 102. The write-once-and-then-read-only register 102 loses the stored second predetermined determination value when power is lost, and the determination value SV1 of the write-once-and-then-read-only register 102 is reset to be the first predetermined determination value when the power is back on. For example, the electronic device 100 can include a core power domain. The power of the registers in the core power domain is arranged to be lost in State S3 or the other deeper sleep states, such as States S4 and S5. Therefore, the write-once-and-then-read-only register 102 can be one of the registers in the core power domain. It should be noted that the first predetermined determination value can be 1, and the second predetermined determination value can be 0. In another embodiment, the first predetermined determination value can be 0, and the second predetermined determination value can be 1. It should be noted that, in one embodiment, the write-once-and-then-read-only register 102 can be implemented in the chipset 104. In another embodiment, the write-once-and-then-read-only register 102 can be implemented outside of the chipset 104, but it is not limited thereto.

The chipset 104 is arranged to couple the central processor 108 with the flash memory 106 and the peripheral devices 111-11N. It should be noted that the peripheral devices 111-11N can be a GPU, a memory, or a network module, etc., but it is not limited thereto. The chipset 104 is arranged to produce a CPU reset signal and a PCI reset signal in the wake-up process or in the warm/cold boot process. For example, in the X86 system, the CPU reset signal is CPU_RST#, and the PCI reset signal is PCI_RST#, wherein the PCI reset signal PCI_RST# is issued by the chipset 104. Moreover, the PCI reset signal is arranged to control the RESET pins of the peripheral devices 111-11N, and the PCI reset signal PCI_RST# and the CPU reset signal CPU_RST# are arranged to control the resetting of the central processor 108. The events that trigger the chipset 104 to produce the PCI reset signal PCIRST# include: waking up the electronic device 100 from the sleep state (such as States S3, S4 and S5 of ACPI), resuming to the normal working state (such as State S0 of ACPI), executing the cold boot process by pressing the power button, etc., but it is not limited thereto. Moreover, the chipset 104 is further arranged to determine a predetermined address according to the determination value SV1, and execute a plurality of platform-related events according to the PCI reset signal. It should be noted that, in one embodiment, the predetermined address is 0xFFFFFFF0 which is arranged to be accessed first by the central processor 108 when the electronic device 100 is powered up. In one embodiment, the predetermined address is one of the addresses of the system storage memory map. In the present invention, the predetermined address can be mapped to the flash memory 106 or to the read-only memory 105.

The chipset 104 includes a read-only memory 105. The read-only memory 105 is implemented in the chipset 104, and the read-only memory 105 can be an On-die ROM. Moreover, the read-only memory 105 has a first memory block corresponding to the predetermined address (0xFFFFFFF0), wherein the first memory block is arranged to store a first instruction. The read-only memory 105 is further arranged to store the programs which are arranged to be executed prior to the BIOS code (Basic Input/Output System, BIOS). The structure of the electronic device 100 of the present invention can be such that the programs stored in the read-only memory 105 can be made to be executed prior to the BIOS code stored in the flash memory 106 in the wake-up process, or in the warm/cold boot process. The details will be described later. In one embodiment of safe-booting, the read-only memory 105 is arranged to store a security verification code to verify the BIOS code stored in the flash memory 106. In another embodiment of safe-booting by the asymmetric cryptographic algorithm, the read-only memory 105 is arranged to store a security verification code and a public key. The central processor 108 is arranged to execute the security verification code stored in the read-only memory 105 according to the first instruction to verify the BIOS code stored in the flash memory 106. It should be noted that the details of the first memory block can be found in the description of FIG. 2.

The flash memory 106 is coupled to the chipset 104. Moreover, the flash memory 106 includes a second memory block corresponding to the predetermined address (0xFFFFFFF0), wherein the second memory block is arranged to store a second instruction. The flash memory 106 is further arranged to store the BIOS code. It should be noted that the details of the second memory block can be found in the description of FIG. 2. In another embodiment, the flash memory 106 is further arranged to store a plurality of platform-related events. In this embodiment, "the platform-related events" are the events or processes that need to be executed by the chipset 104 prior to the BIOS code and prior to the program codes stored in the read-only memory 105. For example, the platform-related events can include accessing the platform-related data which is arranged to set the registers of the main board and chipset 104, such as ROM SIP Data, wherein the ROM SIP Data is the hardware initial setup information stored in the read-only memory. Furthermore, the platform-related events can include accessing the address of the platform-related data stored in the second memory block of the flash memory 106, such as ROM SIP Address. The second instruction is arranged to enable the central processor 108 to execute the BIOS stored in the flash memory 106. It should be noted that a part of the memory block(s) of the read-only memory 105 have the same address as a part of the memory block(s) of the flash memory 106, and the details can be found in the description of FIG. 2.

The central processor 108 is arranged to retrieve the first instruction from the predetermined address (0xFFFFFFF0) of the read-only memory 105 or retrieve the second instruction from the predetermined address (0xFFFFFFF0) of the flash memory 106 according to the CPU reset signal produced by the chipset 104 and the determination value SV1. In one embodiment, the central processor 108 retrieves the first instruction and the second instruction through the chipset 104. For example, the chipset 104 retrieves the first instruction or the second instruction, and transmits the first instruction or the second instruction to the central processor 108. In another embodiment, the central processor 108 includes an integrated memory controller, such that the central processor 108 can access the read-only memory 105 and the flash memory 106 without the chipset. Next, the central processor 108 is arranged to execute the security verification code stored in the read-only memory 105 according to the first instruction, or execute the BIOS code stored in the flash memory 106 according to the second instruction.

Figure 1B:
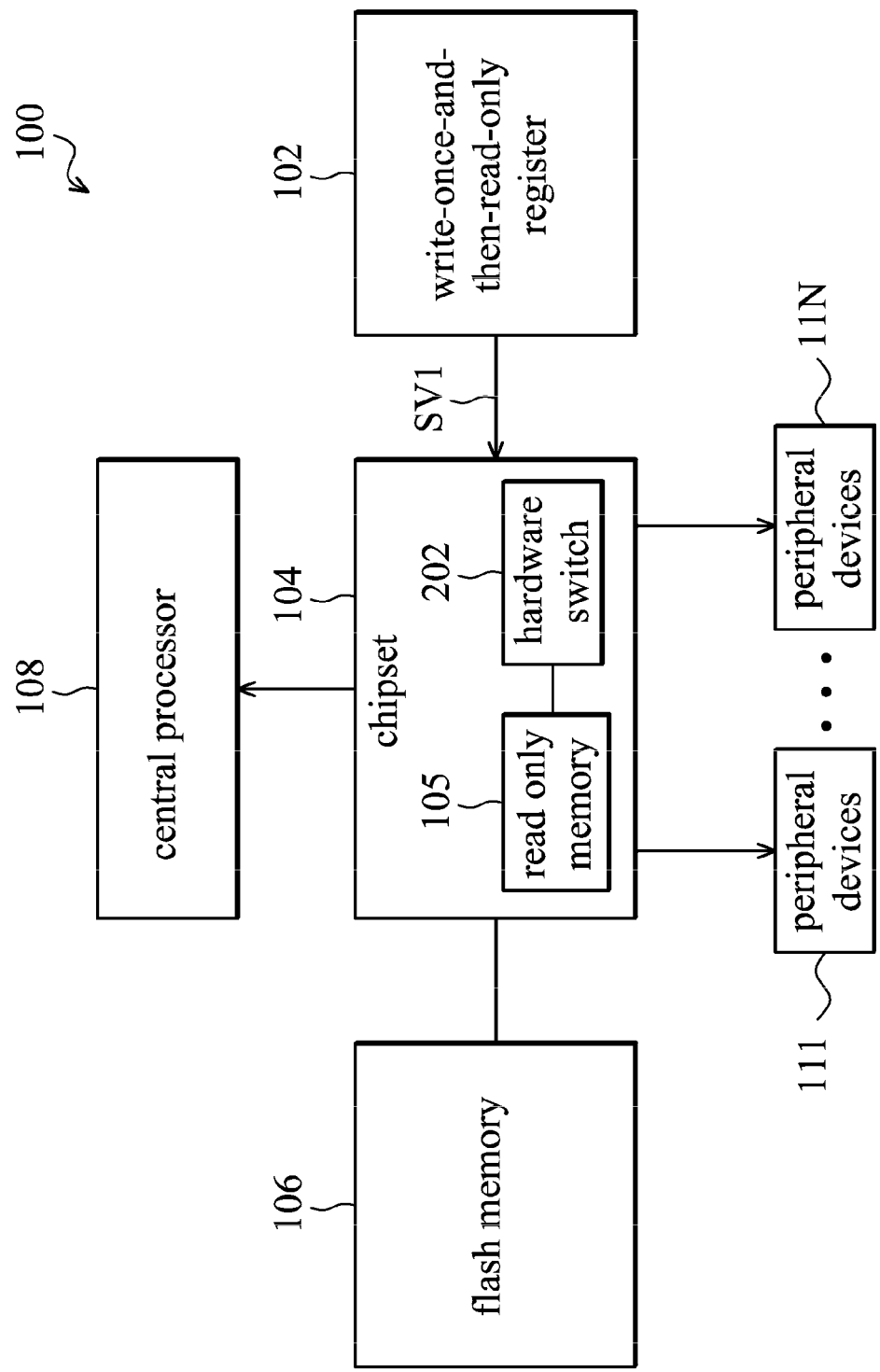
FIG. 1B is a schematic diagram illustrating another embodiment of the electronic device of the present invention.

FIG. 1B is a schematic diagram illustrating another embodiment of the electronic device of the present invention. FIG. 1B is similar to FIG. 1A, except that the chipset 104 of FIG. 1B further includes a hardware switch 202 coupled to the read-only memory 105. The hardware switch 202 is arranged to enable and disable the read-only memory 105. For example, the hardware switch 202 disables the read-only memory 105 when the electronic device starts to execute the warm boot process, the cold boot process or the wake-up process, and enable the read-only memory 105 after the platform-related events are finished executing. In some embodiments, the chipset 104 needs a specific address, such as 0xFFFFFFD0, to retrieve the address of the platform-related data, such as ROM SIP Address, for accessing the platform-related data, such as ROM SIP Data. It should be noted that the addresses of a part of memory blocks of the read-only memory 105 are the same as the address of a part of memory blocks of the flash memory 106, thus the area of the flash memory 106 storing the platform-related data and the addresses thereof overlaps an area of the read-only memory 105. Therefore, in the wake-up process or the warm/cold boot process, the flash memory 106 should respond the access of the predetermined address (such as 0xFFFFFFD0) before the read-only memory 105. Namely, the priority of the flash memory 106 is higher than the read-only memory 105. If the read-only memory 105 responds the access of the predetermined address before the flash memory 106, the chipset 104 will receive the incorrect address of the platform-related data, such that the chipset 104 cannot achieve initialization by the correct platform-related data. Therefore, in this embodiment, the hardware switch 202 is arranged to enable the read-only memory 105 after the execution of the platform-related events are finished.

For example, when the electronic device 100 executes the cold boot process, the chipset 104 produces a PCI reset signal and executes the platform-related events stored in the flash memory 106 according to the PCI reset signal. Moreover, the hardware switch 202 of the chipset 104 is further arranged to disable the read-only memory 105 according to the PCI reset signal during the cold boot process. In another embodiment, the PCI reset signal is produced and transmitted to the chipset 104 by the other component rather than chipset 104.

When the executions of the platform-related events are finished, the hardware switch 202 is arranged to enable the read-only memory 105. Then the chipset 104 is further arranged to provide the CPU reset signal to the central processor 108 after the hardware switch 202 enables the read-only memory 105. Next, the central processor 108 accesses the instruction stored in the predetermined address (0xFFFFFFF0) according to the CPU reset signal produced by the chipset 104 and the determination value SV1. It should be noted that the write-once-then-read-only register 102 is not rewritten yet, such that the determination value SV1 is the first predetermined determination value (default value).

Therefore, when the determination value SV1 is the first predetermined determination value, the chipset 104 retrieves the first instruction from the predetermined address (0xFFFFFFF0) of the read-only memory 105 according to the first predetermined determination value, and transmits the first instruction to the central processor 108. Next, the central processor 108 executes the program codes, such as the security verification code, stored in the read-only memory 105 according to the first instruction for verifying the integrity of the BIOS code stored in the flash memory 106.

In the embodiment of safe-booting by the asymmetric cryptographic algorithm, the central processor 108 is arranged to execute a digital-signature decoding process on the BIOS code stored in the flash memory 106 by the security verification code and a public key. In particular, the security verification code obtains a digital signature from an area of the flash memory 106, wherein the digital signature is determined by encoding a private key when the manufacturer produced the electronic device 100. It should be noted that the private key can be stored in any storage device outside the electronic device 100, but it is not limited thereto. The security verification code enables the central processor 108 to calculate a Hash Value of the BIOS code after the security verification code obtains the digital signature. Next, the security verification code enables the central processor 108 to decode the digital signature according to the public key stored in the read-only memory 105 for obtaining a comparison value, and the central processor 108 is further arranged to compare the Hash Value with the comparison value. When the comparison value and the Hash Value are the same, the central processor 108 determines that the integrity of the BIOS code has not been compromised. Moreover, when the comparison value and the Hash Value are different, the central processor 108 determines that the integrity of the BIOS code has been compromised.

When the verification of the security verification code stored in the read-only memory 105 is successful (pass), namely, when the verification shows that the integrity of the BIOS code has not been compromised, the central processor 108 is further arranged to rewrite the write-once-then-read-only register 102 to use the second predetermined determination value as the determination value SV1, and enable the chipset 104 to produce the CPU reset signal again. Moreover, when the verification of the security verification code stored in the read-only memory 105 fails, namely, when the verification shows that the integrity of the BIOS code has been compromised, the central processor 108 forces the electronic device 100 to shut down.

When the central processor receives the CPU reset signal which is reproduced by the chipset 104, the central processor 108 retrieves the instruction from the predetermined address (0xFFFFFFF0) according to the CPU reset signal and the determination value SV1. It should be noted that the determination value SV1 of the write-once-then-read-only register 102 is already rewritten to be the second predetermined determination value. Therefore, when the determination value SV1 is the second predetermined determination value, the central processor 108 retrieves the second instruction from the predetermined address (0xFFFFFFF0) of the flash memory 106 according to the second predetermined determination value, directly or through the chipset 104. In one embodiment, the central processor 108 executes the BIOS code stored in the flash memory 106 according to the second instruction to continue the normal booting process.

In another embodiment, the BIOS code stored in the flash memory 106 is further arranged to enable the central processor 108 to determine whether the electronic device 100 is executing the warm boot process. For example, in the warm boot process, the chipset 104 is firstly arranged to produce a CPU reset signal, and transmit the CPU reset signal to the central processor 108. Next, the central processor 108 retrieves the instruction from the predetermined address (0xFFFFFFF0) according to the CPU reset signal and the determination value SV1. It should be noted that the electronic device 100 must have already executed a cold boot before warm boot. Therefore, the determination value SV1 of the write-once-then-read-only register 102 had been rewritten as the second predetermined determination value in the cold boot process. When the determination value SV1 is the second predetermined determination value, the central processor 108 retrieves the second instruction of the predetermined address (0xFFFFFFF0) of the flash memory 106 according to the second predetermined determination value, directly or through the chipset 104. Next, the central processor 108 executes the BIOS code stored in the flash memory 106 according to the second instruction, and determines whether the electronic device 100 is executing a warm boot process by the BIOS code.

In the higher-security booting embodiment, the security verification code stored in the read-only memory 105 is also required to be executed during the warm boot process. Thus, the electronic device 100 need to transform the warm boot process to a cold boot process for executing the security verification code in the warm boot process. For example, when the central processor 108 determines that the electronic device 100 is executing a warm boot process, the central processor 108 enables the chipset 104 to produce a PCI reset signal to execute the platform-related events stored in the flash memory 106 to reset the registers of the main board and the chipset 104. Moreover, the hardware switch 202 of the chipset 104 is further arranged to disable the read-only memory 105 according to the PCI reset signal during the warm boot process. In another embodiment, the PCI reset signal can be produced and transmitted to the chipset 104 by the other component of the electronic device 100 rather than chipset 104.

Next, the hardware switch 202 enables the read-only memory 105 when the executions of platform-related events are finished. The chipset 104 is further arranged to produce the CPU reset signal after the hardware switch 202 enables the read-only memory 105, and transmit the CPU reset signal to the central processor 108. Next, the central processor 108 retrieves instructions from the predetermined address (0xFFFFFFF0) according to the determination value SV1 and the CPU reset signal produced by the chipset 104. More specifically, it should be noted that the PCI reset signal produced by the chipset 104 is further arranged to enable power to the write-once-then-read-only register 102 again. Therefore, the determination value SV1 of the write-once-then-read-only register 102 is the first predetermined determination value now.

Therefore, when the determination value SV1 is the first predetermined determination value, the chipset 104 retrieves the first instruction from the predetermined address (0xFFFFFFF0) of the read-only memory 105 according to the first predetermined determination value. Next, the central processor 108 executes the security verification code stored in the read-only memory 105 according to the first instruction for verifying the integrity of the BIOS code stored in the flash memory 106. When the execution of the security verification code is successful, the central processor 108 further rewrites the write-once-then-read-only register 102 to use the second predetermined determination value as the determination value SV1 of, and enable the chipset 104 to produce the CPU reset signal again. When the integrity of the BIOS code has been compromised, the central processor 108 forces the electronic device 100 to shut down.

Next, when the central processor receives the CPU reset signal reproduced by the chipset 104, the central processor 108 retrieves instructions from the predetermined address 0xFFFFFFF0 according to the CPU reset signal and the determination value SV1. It should be noted that the determination value SV1 of the write-once-then-read-only register 102 had been rewritten as the second predetermined determination value. Therefore, when the determination value SV1 is the second predetermined determination value, the chipset 104 retrieves the second instruction from the predetermined address (0xFFFFFFF0) of the flash memory 106 according to the second predetermined determination value, and transmits the second instruction to the central processor 108. Next, the central processor 108 executes the BIOS code stored in the flash memory 106 according to the second instruction to continue the normal booting process.

Figure 2:
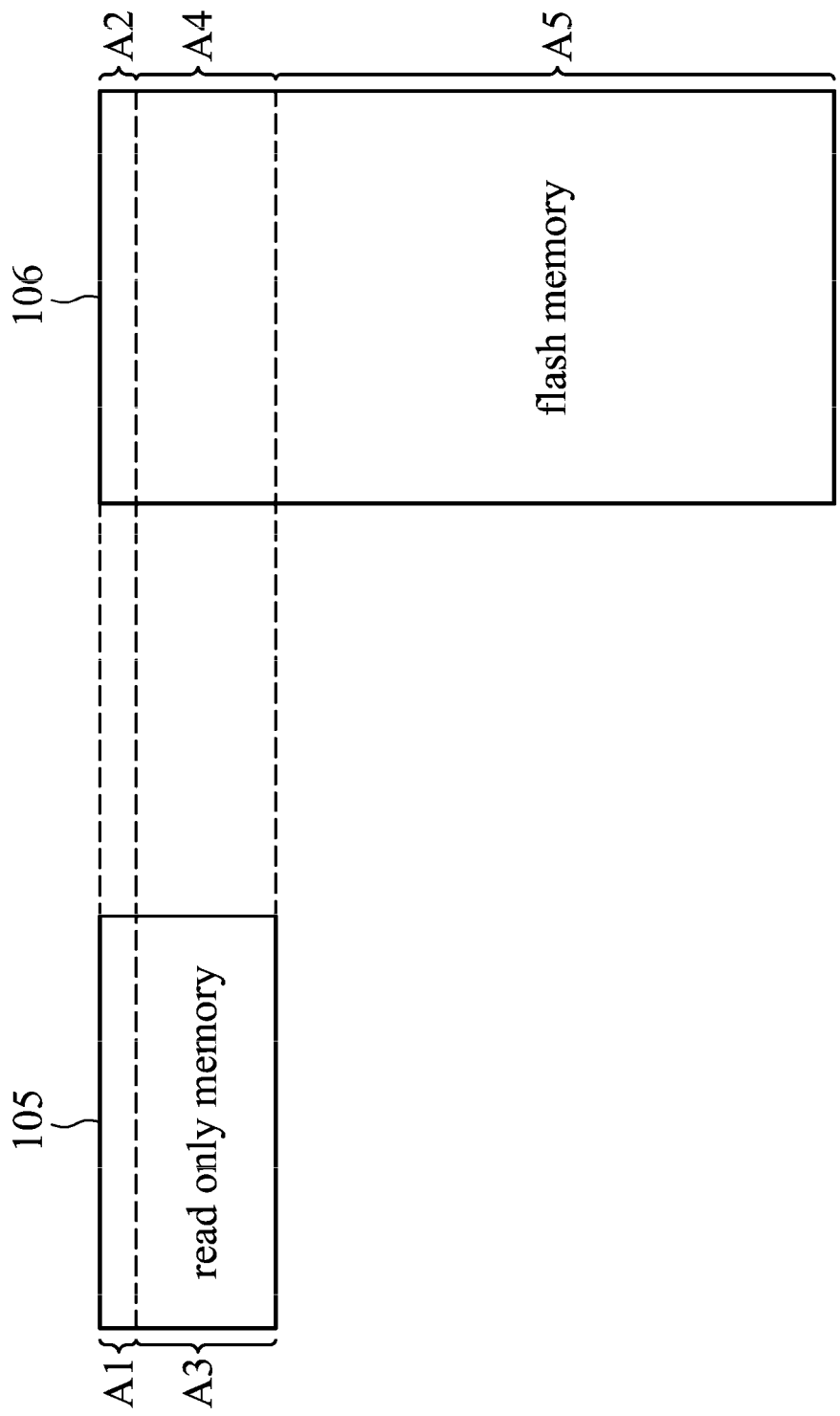
FIG. 2 is a schematic diagram illustrating an embodiment of a memory of the present invention.

FIG. 2 is a schematic diagram illustrating an embodiment of a memory of the present invention. FIG. 2 includes the read-only memory 105 and the flash memory 106 of the electronic device 100. The read-only memory 105 includes a first memory block A1 and a third memory block A3, wherein the first memory block A1 of the read-only memory 105 corresponds to the predetermined address (0xFFFFFFF0), and the first memory block A1 is arranged to store the first instruction. Furthermore, the third memory block A3 is arranged to store the security verification code. It should be noted that, in one embodiment, the address decode range of the first memory block A1 of the read-only memory 105 is 4 GB (or less than 4 GB) and on the top of the storage area of the 4 GB. The flash memory 106 includes a second memory block A2, a fourth memory block A4 and a fifth memory block A5, wherein the second memory block A2 of the read-only memory 10 corresponds to the predetermined address (0xFFFFFFF0) and is arranged to store the second instruction. The fourth memory block A4 and/or the fifth memory block A5 is/are arranged to store the BIOS code. In another embodiment of the present invention, the fourth memory block A4 and/or the fifth memory block A5 is further arranged to store the data of the platform-related events. For example, in one embodiment, the platform-related events include the platform-related data (such as the ROM SIP Data) which is arranged to set the registers of the main board and the chipset 104, and the address of the platform-related data is stored in the fourth memory block A4. For example, the address of the platform-related data is stored in the address (0xFFFFFFD0) of the fourth memory block A4, and the platform-related data is arranged to be stored in the fifth memory block A5, but it is not limited thereto.

It should be noted that the address (0xFFFFFFF0) of the first memory block A1 of the read-only memory 105 is same as the address (0xFFFFFFF0) of the second memory block A2 of the flash memory 106, and the address of the third memory block A3 of the read-only memory 105 is same as the address of the fourth memory block A4 of the flash memory 106. When the chipset 104 needs to simultaneously access the read-only memory 105 and the flash memory 106, the chipset 104 is further arranged to shadow the memory block A2 and the fourth memory block A4 of the flash memory 106 to a spare area and access the memory block A2 and A4 of the flash memory 106 from the spare area, wherein the addresses of the memory block A2 and A4 of the flash memory 106 overlap with the read-only memory 105. For example, the central processor 108 executes the security verification code stored in the read-only memory 105 according to the first instruction to verify the BIOS code stored in the flash memory 106, such that the chipset 104 needs to access the read-only memory 105 and the flash memory 106 at the same time. Therefore, the chipset 104 shadows the second memory block A2 and the fourth memory block A4 to the spare area for accessing the first memory block A1 and the third memory block A3 of the read-only memory 105 and the first memory block A1 and the third memory block A3 of the flash memory 106, simultaneously. For example, the spare area can be memory blocks locating below the address of the fifth memory block A5 without addresses interference with the above memory blocks, or in other memory devices.

Figure 3A:
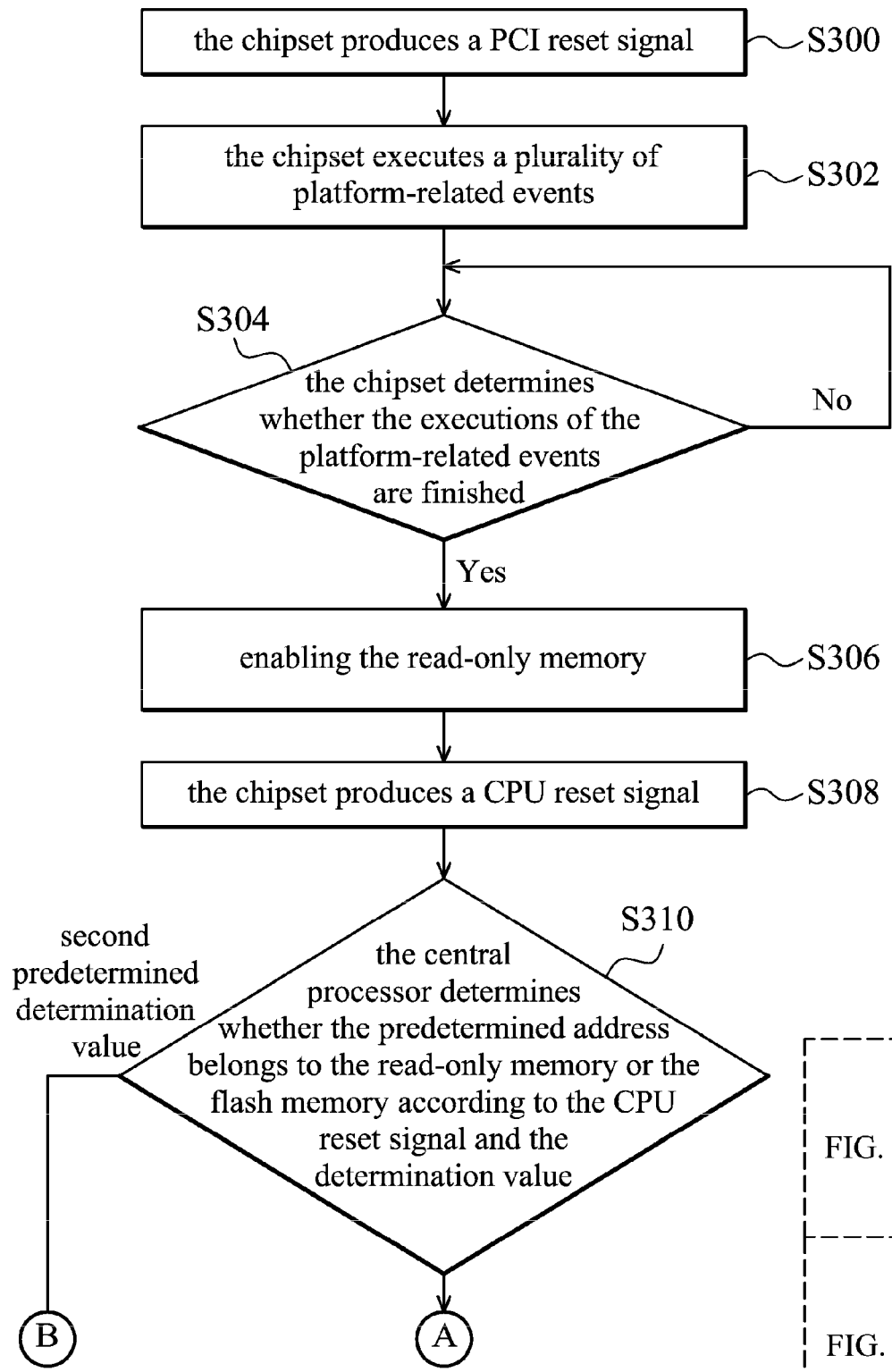
FIGS. 3A and 3B are flowcharts of a booting method according to an embodiment of the present invention.
Figure 3B:
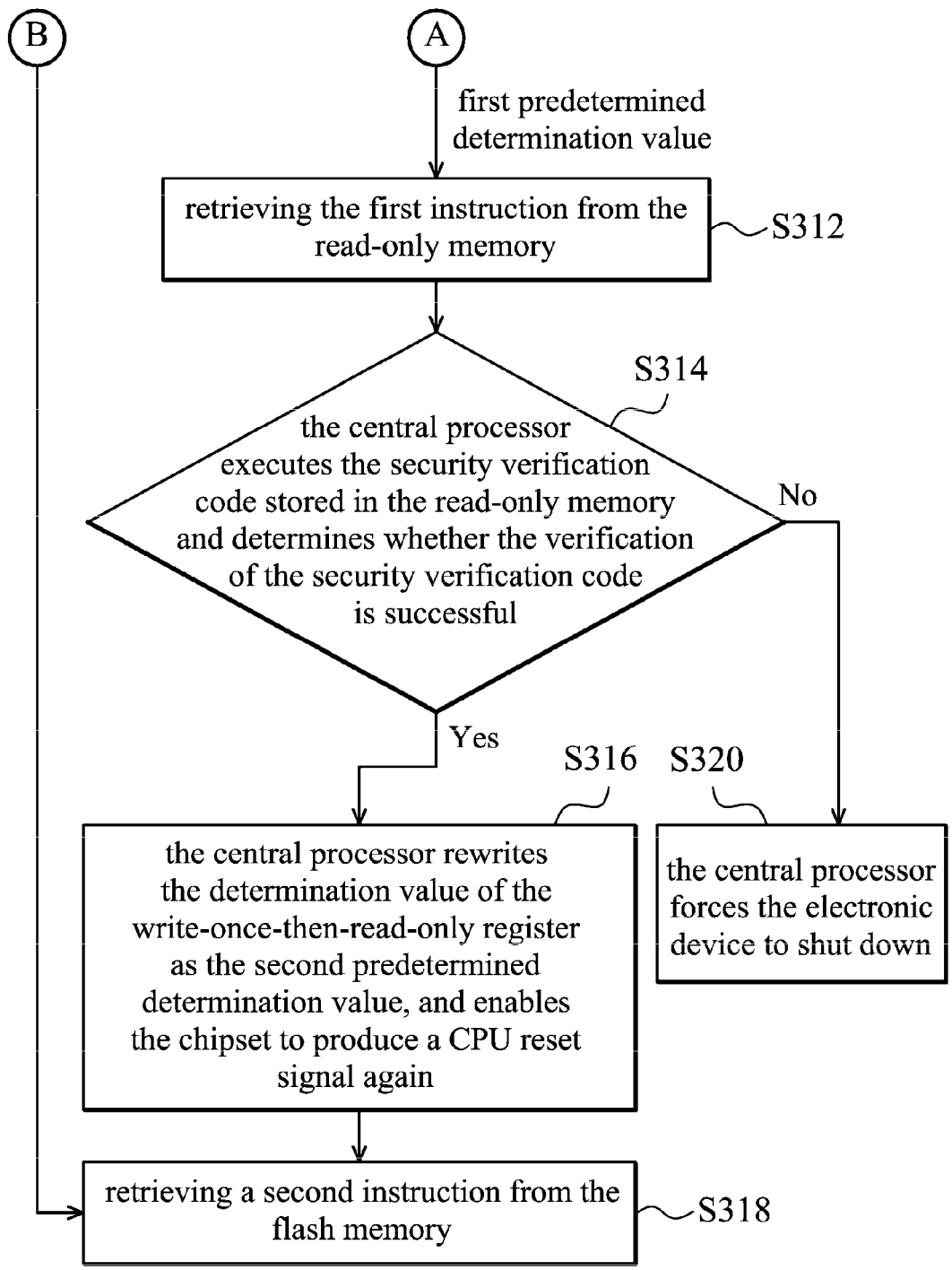

FIGS. 3A and 3B are flowcharts of a booting method according to an embodiment of the present invention, wherein the booting method is applied to the cold boot process or the wake-up process waking up the electronic device 100 from the sleep state (such as States S3-S5 of ACPI). The process starts at step S300.

In step S300, when the electronic device 100 executes the cold boot process or the wake-up process, the chipset 104 produces a PCI reset signal. In another embodiment, the PCI reset signal can be produced and transmitted to the chipset 104 by other component rather than chipset 104.

Next, in step S302, the chipset 104 executes a plurality of platform-related events stored in the flash memory 106 according to the PCI reset signal. In this embodiment, the "platform-related events" are the events or processes that need to be executed by the chipset 104 prior to the BIOS code and the program codes stored in the read-only memory 105. For example, the platform-related events can include accessing the platform-related data, such as ROM SIP Data, which is arranged to set the registers of the main board and chipset 104, wherein the ROM SIP Data is the hardware initial setup information stored in the read-only memory 105. Furthermore, the platform-related events can include accessing the address of the platform-related data, such as ROM SIP Address. In another embodiment of the present invention, in step S302, the electronic device 100 is further arranged to disable the read-only memory 105 by the hardware switch 202 of the chipset 104. In yet another embodiment, the default state of the read-only memory 105 can be "disable".

Next, in step S304, the chipset 104 determines whether the executions of the platform-related events are finished. When the executions of the platform-related events are finished, the process goes to step S306, otherwise, the chipset 104 continues to determine whether the executions of the platform-related events are finished.

In step S306, the electronic device 100 enables the read-only memory 105, for example, enables the read-only memory 105 by the hardware switch 202 of the chipset 104.

Next, in step S308, the chipset 104 produces a CPU reset signal, and transmits the CPU reset signal to the central processor 108.

Next, in step S310, the central processor 108 determines whether the predetermined address belongs to the read-only memory 105 or the flash memory 106 according to the CPU reset signal and the determination value SV1 of the write-once-then-read-only register 102, wherein the predetermined address is 0xFFFFFFF0. When the determination value SV1 is the first predetermined determination value, the chipset 104 determines that the predetermined address belongs to the read-only memory 105, and the process goes to step S312. When the determination value SV1 is a second predetermined determination value, the chipset 104 determines that the predetermined address belongs to the flash memory 106, and the process goes to step S318. It should be noted that the write-once-then-read-only register 102 preserves the determination value SV1 when power is provided to the write-once-then-read-only register 102, and the write-once-then-read-only register 102 allows the determination value SV1 to be rewritten only one time until power is lost.

In step S312, the central processor 108 retrieves the first instruction from the first memory block A1 corresponding to the predetermined address (0xFFFFFFF0) of the read-only memory 105, directly or through the chipset 104, wherein the read-only memory 105 is implemented in the chipset 104.

Next, in step S314, the central processor 108 executes the security verification code stored in the read-only memory 105 according to the first instruction and determines whether the verification of the security verification code is successful. For example, the central processor 108 is arranged to determine whether the integrity of the BIOS code stored in the flash memory 106 has been compromised. In one of the embodiments of the present invention, the central processor 108 is arranged to execute a digital-signature decoding process on the BIOS code stored in the flash memory 106 by the security verification code and a public key, and compare the decoded digital signature with a Hash Value to verify the integrity of the BIOS code, wherein the Hash Value of the BIOS code is calculated by the central processor 108 in response to the security verification code. When the verification of the security verification code stored in the read-only memory 105 is successful, the process goes to step S316, otherwise, the process goes to step S320.

More specifically, the security verification code obtains a digital signature from an area of the flash memory 106, wherein the digital signature is determined by encoding a Private key when the manufacturer produced the electronic device 100. It should be noted that the Private key can be stored in any storage device outside for the electronic device 100, but it is not limited thereto. The security verification code enables the central processor 108 to calculate a Hash Value of the BIOS code after the security verification code obtains the digital signature. Next, the security verification code enables the central processor 108 to decode the digital signature according to the public key stored in the read-only memory 105 for obtaining a comparison value, and the central processor 108 is further arranged to compare the Hash Value with the comparison value. When the comparison value and the Hash Value are the same, the central processor 108 determines that the integrity of the BIOS code has not been compromised.

Moreover, when the comparison value and the Hash Value are different, the central processor 108 determines that the integrity of the BIOS code has been compromised.

In step S316, when the verification of the security verification code stored in the read-only memory 105 is successful (when the integrity of the BIOS code has not been compromised), the central processor 108 rewrites the determination value SV1 of the write-once-then-read-only register 102 as the second predetermined determination value, and enables the chipset 104 to produce a CPU reset signal again.

Next, in step S318, the central processor 108 retrieves a second instruction from the second memory block A2 corresponding to the predetermined address (0xFFFFFFF0) of the flash memory 106, directly or through the chipset 104. In one embodiment, the central processor 108 executes the BIOS code stored in the flash memory 106 according to the second instruction to execute the normal boot process. The process ends at step S318.

In step S320, the central processor 108 forces the electronic device 100 to shut down. The process ends at step S320.

Figure 4A:
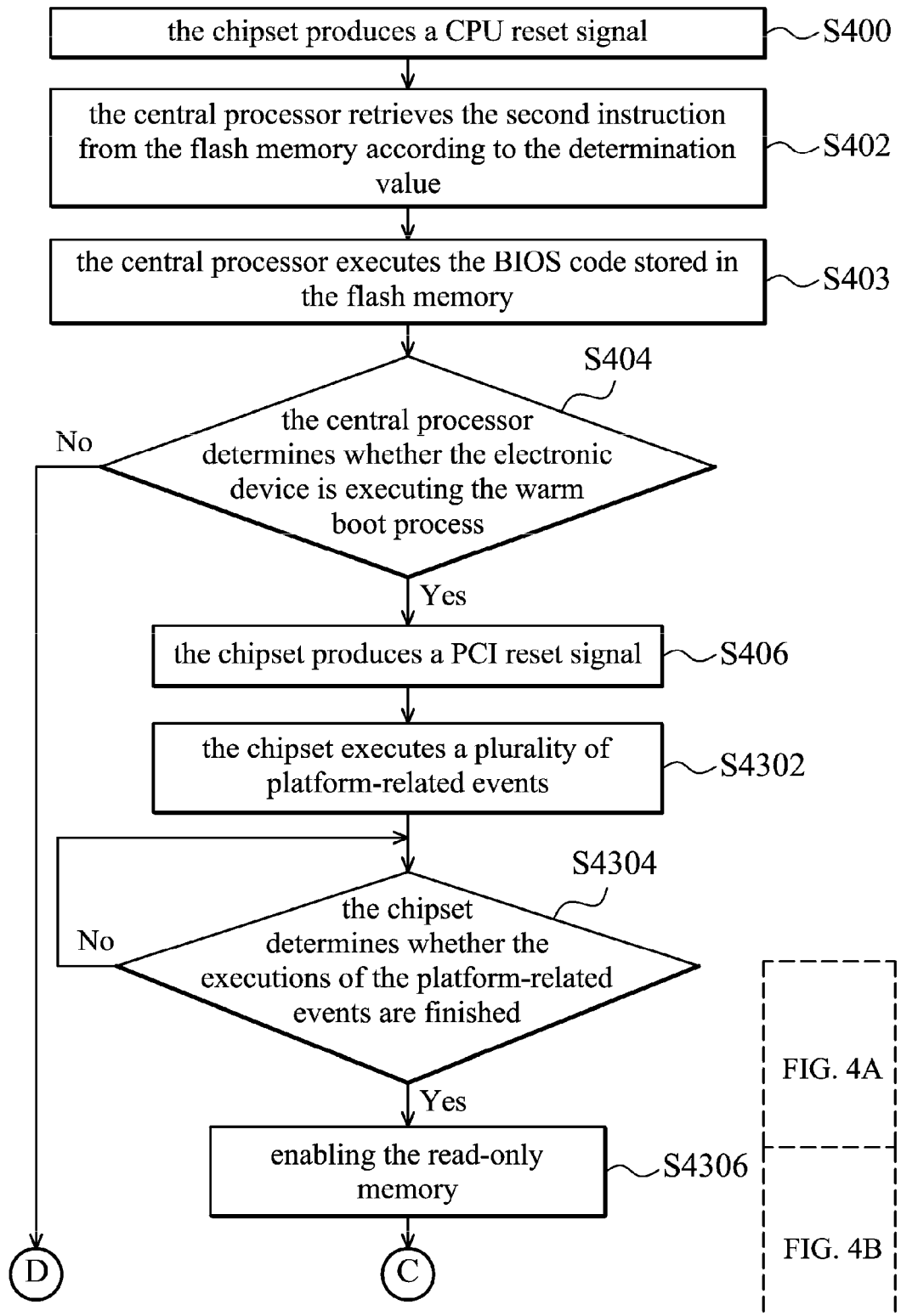
FIGS. 4A and 4B are flowcharts of a booting method according to an embodiment of the present invention.
Figure 4B:
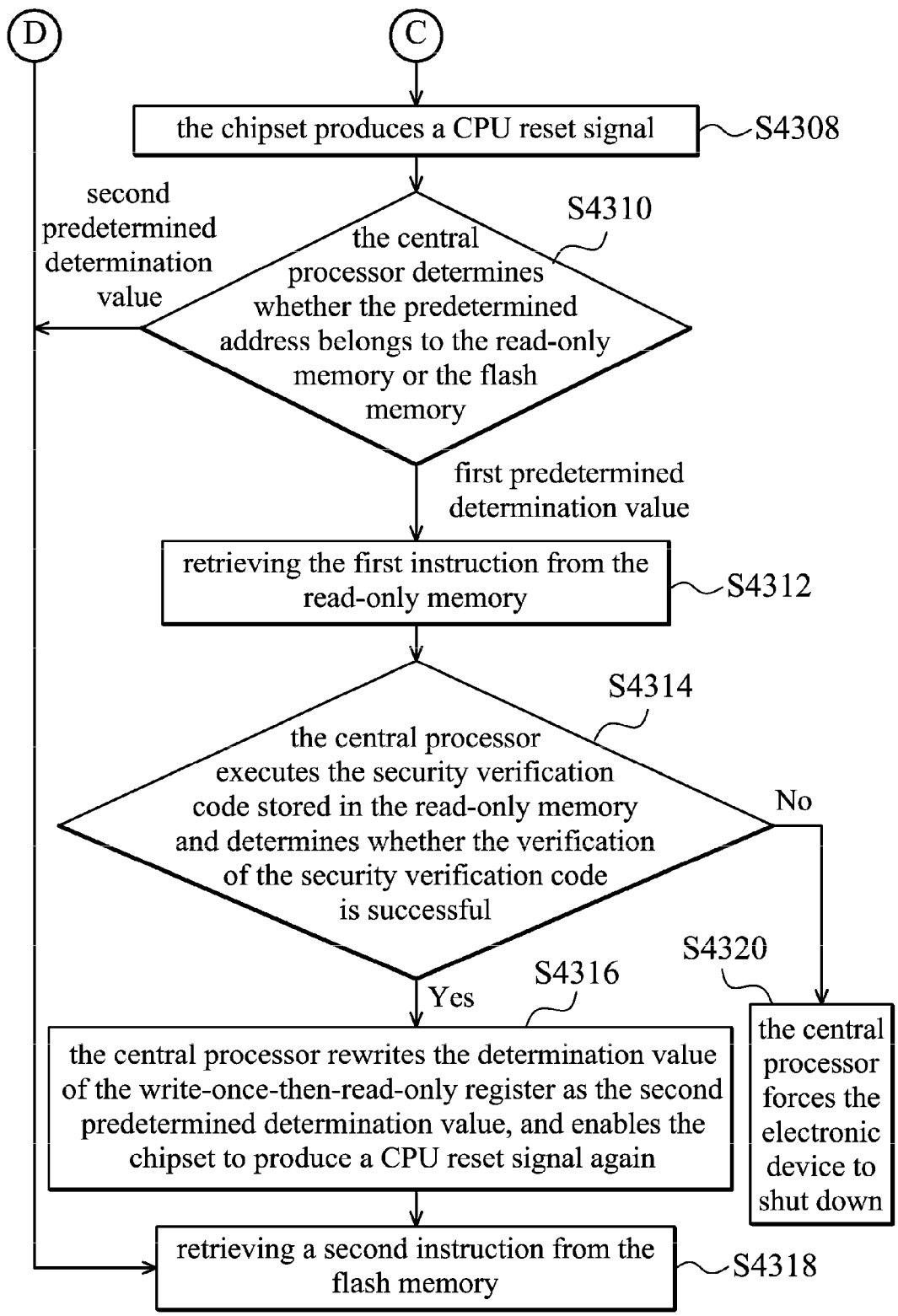

FIGS. 4A and 4B are flowcharts of a booting method according to an embodiment of the present invention, wherein the booting method is applied to the warm boot process of the electronic device 100. The process starts at step S400.

In step S400, the chipset 104 produces a CPU reset signal, and transmits the CPU reset signal to the central processor 108.

In step S402, the central processor 108 retrieves the instruction according to the CPU reset signal, wherein the central processor 108 is arranged to retrieve instruction from the predetermined address (0xFFFFFFF0) according to the determination value SV1. It should be noted that the electronic device 100 must have already executed a cold boot before warm boot. Therefore, the determination value SV1 of the write-once-then-read-only register 102 had been rewritten as the second predetermined determination value. When the determination value SV1 is the second predetermined determination value, the central processor 108 retrieves the second instruction from the predetermined address (0xFFFFFFF0) of the flash memory 106 according to the second predetermined determination value, directly or through the chipset 104.

In step S403, the central processor 108 executes the BIOS code stored in the flash memory 106 according to the second instruction.

In step S404, the central processor determines whether the electronic device 100 is executing the warm boot process. When the electronic device 100 is executing the warm boot process, the process goes to step S406, otherwise, the process goes to step S4318.

In step S406, the central processor 108 enables the chipset 104 to produce a PCI reset signal. Next, the process goes to step S4302. It should be noted that steps S4302-S4320 of FIG. 4 are similar to steps S302-S320 of FIG. 3. Therefore, it could be referred to FIG. 3 for details of steps S4302-S4320.

The booting method of the electronic device 100 provided by the present invention is implemented by depositing a read-only memory 105 in the chipset 104, wherein the read-only memory 105 is transparent to the BIOS. The booting method of electronic device 100 provided by the present invention is arranged to locate the first instruction issued by the central processor 108 to the read-only memory 105 when the electronic device executes the warm boot process/cold boot process or the wake-up process, such that the security verification code stored in the read-only memory 105 can be executed prior to the BIOS code stored in the flash memory 106. In one embodiment, the BIOS integrity of the electronic device 100 is arranged to be checked by the security verification code before the electronic device 100 executes the BIOS. Moreover, the users do not need to modify the original BIOS code to implement the security verification code of the present invention in the read-only memory 105 for checking the BIOS integrity before the electronic device 100 executes the BIOS, because the read-only memory 105 of the present invention is transparent to the BIOS.

Mapping management methods and systems, or certain aspects or portions thereof, may take the form of a software translation layer used between the file system of the host and the non-volatile memory (i.e., program code) embodied in tangible media, such as products, floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
a write-once-then-read-only register, arranged to store a determination value;
a chipset, arranged to produce a CPU reset signal;
a read-only memory, implemented in the chipset, wherein the read-only memory has a first memory block corresponding to a predetermined address, and the first memory block is arranged to store a first instruction;
a flash memory, coupled to the chipset, wherein the flash memory has a second memory block corresponding to the predetermined address, and the second memory block is arranged to store a second instruction; and
a central processor, arranged to determine the location of the predetermined address according to the CPU reset signal and the determination value,
wherein the central processor retrieves the first instruction when the determination value is a first predetermined determination value, and the central processor retrieves the second instruction when the determination value is a second predetermined determination value.

2. The electronic device as claimed in claim 1, wherein the central processor retrieves the first instruction or the second instruction through the chipset.

3. The electronic device as claimed in claim 1, wherein the first predetermined determination value is set as a default value of the determination value, the write-once-then-read-only register preserves the determination value when power is provided to the write-once-then-read-only register, and the write-once-then-read-only register allows the determination value to be rewritten only one time until power is lost.

4. The electronic device as claimed in claim 1, wherein the central processor further executes a security verification code stored in the read-only memory according to the first instruction to verify a BIOS (basic input/output service) code stored in the flash memory.

5. The electronic device as claimed in claim 4, wherein the central processor executes a digital-signature decoding process on the BIOS code stored in the flash memory according to the security verification code and a public key to verify the integrity of the BIOS code.

6. The electronic device as claimed in claim 4, wherein when the BIOS code is successfully verified by the security verification code, the central processor rewrites the write-once-then-read-only register to use the second predetermined determination value as the determination value, and enable the chipset to produce the CPU reset signal again.

7. The electronic device as claimed in claim 1, wherein the central processor further executes a BIOS (basic input/output service) code stored in the flash memory according to the second instruction.

8. The electronic device as claimed in claim 1, wherein the read-only memory further has a third memory block corresponding to a plurality of addresses and the flash memory further has a fourth memory block corresponding to the same addresses as the third memory block, wherein the chipset further shadows the second memory block and the fourth memory block of the flash memory to a spare area for simultaneously accessing the first memory block and the third memory block of the read-only memory and the second memory block and the fourth memory block of the flash memory.

9. The electronic device as claimed in claim 1, wherein the chipset is further arranged to produce a PCI reset signal when the electronic device executes a wake-up process, a warm boot process or a cold boot process, and the chipset is further arranged to execute a plurality of platform-related events according to the PCI reset signal.

10. The electronic device as claimed in claim 9, wherein the chipset further comprises a hardware switch arranged to enable the read-only memory when the platform-related events are finished executing, and the chipset is further arranged to produce the CPU reset signal after the read-only memory is enabled.

11. The electronic device as claimed in claim 1, wherein the predetermined address is first to be accessed by the central processor when the electronic device is powered up.

12. A booting method, applied to an electronic device, wherein the booting method comprises:
 producing a CPU reset signal by a chipset, and transmitting the CPU reset signal to a central processor;
 determining the location of a predetermined address by the central processor according to the CPU reset signal and a determination value of a write-once-then-read-only register;
 retrieving a first instruction from a first memory block of a read-only memory when the determination value is a first predetermined determination value, wherein the first memory block corresponds to the predetermined address; and
 retrieving a second instruction from a second memory block of a flash memory when the determination value is a second predetermined determination value, wherein the second memory block corresponds to the predetermined address,
 wherein the read-only memory is implemented in the chipset.

13. The booting method as claimed in claim 12, wherein the first predetermined determination value is set as a default value of the determination value, the write-once-then-read-only register preserves the determination value when power is provided to the write-once-then-read-only register, and the write-once-then-read-only register allows the determination value to be rewritten only one time until power is lost.

14. The booting method as claimed in claim 12, further comprising executing a security verification code stored in the read-only memory according to the first instruction to verify a BIOS (basic input/output service) code stored in the flash memory.

15. The booting method as claimed in claim 14, wherein step of verifying the BIOS code stored in the flash memory further comprises:
 executing a digital-signature decoding process on the BIOS code stored in the flash memory according to the security verification code and a public key to verify the integrity of the BIOS code.

16. The booting method as claimed in claim 14, further comprising when the BIOS code is successfully verified by the security verification code, rewriting the write-once-then-read-only register to use the second predetermined determination value as the determination value, and producing the CPU reset signal again.

17. The booting method as claimed in claim 12, further comprising executing a BIOS (basic input/output service) code stored in the flash memory according to the second instruction.

18. The booting method as claimed in claim 12, wherein the read-only memory has a third memory block corresponding to a plurality of addresses and the flash memory has a fourth memory block corresponding to the same addresses as the third memory block, and the booting method further comprises:
 shadowing the second and the fourth memory block of the flash memory to a spare area; and
 accessing the second and the fourth memory block of the flash memory from the spare area.

19. The booting method as claimed in claim 12, further comprising:
 producing a PCI reset signal when the electronic device executes a wake-up process, a warm boot process or a cold boot process; and
 executing a plurality of platform-related events according to the PCI reset signal.

20. The booting method as claimed in claim 19, further comprising:
 enabling the read-only memory when the platform-related events are finished executing; and
 producing the CPU reset signal after the read-only memory is enabled.

* * * * *